March 4, 1941.   L. E. NICHOLS   2,233,897
WELDING ELECTRODE ASSEMBLY FOR WELDING MACHINES
Filed April 28, 1938
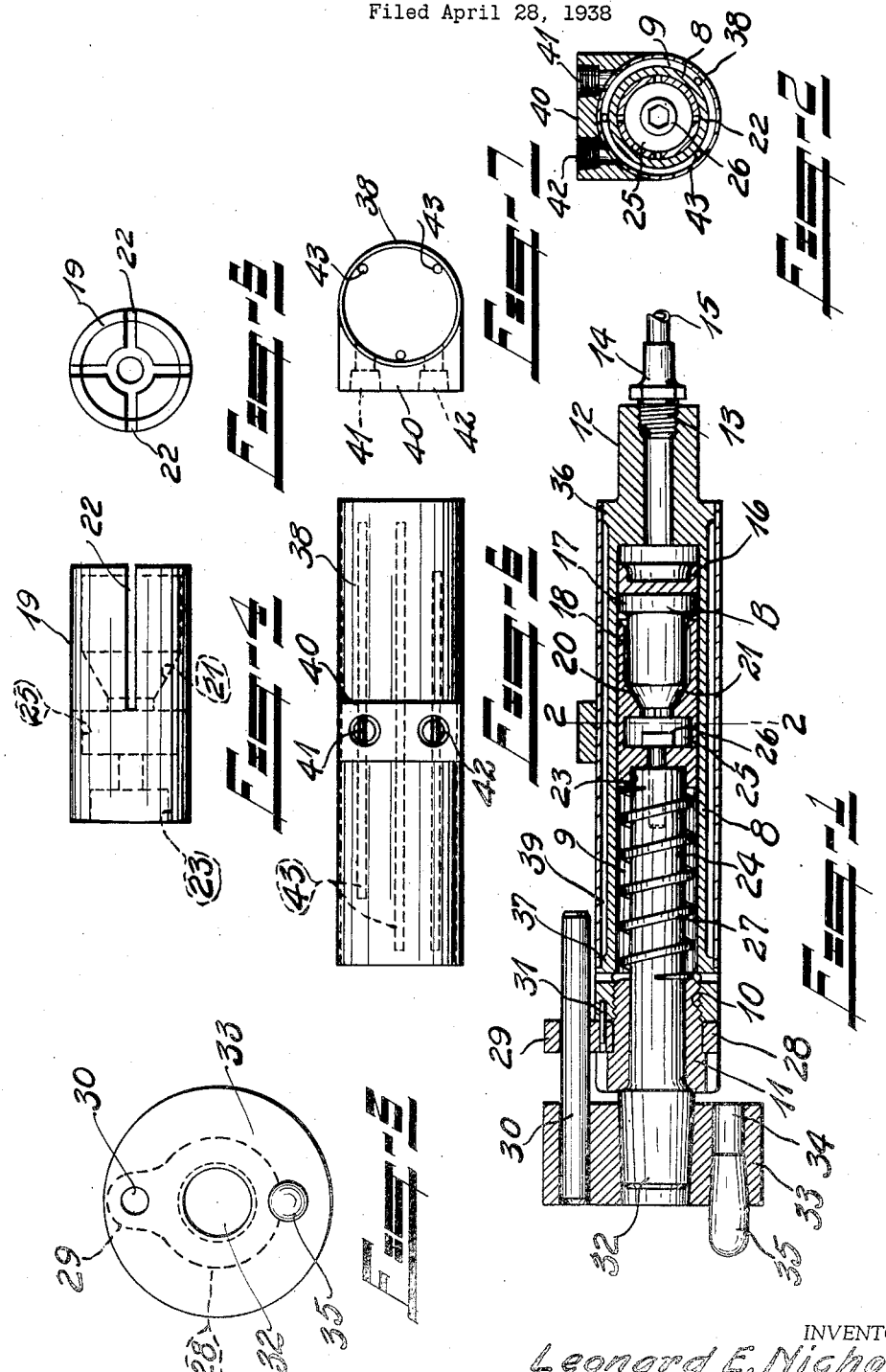
INVENTOR.
Leonard E. Nichols
BY Frank C. Scarman
ATTORNEY.

Patented Mar. 4, 1941

2,233,897

UNITED STATES PATENT OFFICE 2,233,897

WELDING ELECTRODE ASSEMBLY FOR WELDING MACHINES

Leonard E. Nichols, Bay City, Mich., assignor to National Electric Welding Machines Co., Bay City, Mich.

Application April 28, 1938, Serial No. 204,725

9 Claims. (Cl. 219—4)

This invention relates to welding machines, and more particularly to the type in which the "work" is placed between a stationary electrode and a series of movable electrodes which are successively actuated to contact the work and simultaneously supplied with welding current.

One of the prime objects of the invention is to design an electrode assembly, the body of which is formed of electrically conductive material, thus eliminating conventional, flexible conductors used for conveying the welding current to the electrode.

Another object of the invention is to design an electrode formed of electrically conductive material and including an expansible collet which is automatically expanded when the electrode engages the "work," thus providing a metal to metal contact under pressure.

A further object is to design an electrode assembly formed with a cooling circulating system surrounding the current carrying member for the effective cooling thereof.

A still further object is to design a simple, practical and inexpensive electrode assembly which is readily accessible for cleaning or repair, and which can be easily and quickly assembled.

The annexed drawing and the following description set forth in detail certain mechanism embodying the invention, such disclosed means constituting however, but one of the various mechanical forms in which the principle of the invention may be used.

In the drawing:

Fig. 1 is a central longitudinal section through my improved electrode unit.

Fig. 2 is a transverse sectional end view taken on the line 2—2 of Fig. 1.

Fig. 3 is an end view.

Fig. 4 is an enlarged detail showing the expansible collet.

Fig. 5 is an end view thereof.

Fig. 6 is a side elevational detail of the water jacket.

Fig. 7 is an end view thereof.

Referring now more particularly to the drawing in which I have shown one embodiment of my invention, the assembly comprises a cylindrical body member 8 longitudinally bored as at 9, the lower end being open and is interiorly threaded as at 10 to receive a bushing 11 which forms an extension of said member, the upper end being formed with a neck 12, bored and threaded as at 13 to accommodate the nipple 14 to which the pipe 15 is connected as usual.

A piston assembly B is slidably mounted in the bore 9 and includes a cup member 16 mounted in the upper end of the body member and bearing against a piston 17 as shown, the body section of said piston being shouldered and turned as at 18, said shouldered end extending into a collet 19 which is also slidably mounted in the bore 9, the lower end 20 of said piston being frusto-conical in shape and bearing against a tapered seat 21 formed in said collet, the upper end section of the collet being split as at 22, the lower end being cup shaped as at 23 to accommodate and receive the upper end of a piston rod 24. An enlarged chamber 25 communicates with the seat 21 and accommodates the head of a screw 26 which serves to rigidly secure the rod and collet in assembled relation.

A helical spring 27 surrounds the rod 24 and is interposed between the lower end of the collet and the upper end of the bushing 11, said spring serving to return the mechanism to original position after a weld has been made and as will hereinafter be more fully described.

A collar 28 is mounted on the bushing 11 and abuts against the lower end of the body member 8, said collar having an offset section 29 which is bored to slidably receive a guide pin 30, this collar being non-rotatably secured in position by means of pins 31.

A head 32 is provided on the lower end of the rod 24 and an electrode holder 33 is mounted thereon, said holder being centrally bored as at 34 to accommodate said head. An electrode 35 is mounted, off center, in said holder in diametrically opposed relation to the guide pin 30; this arrangement preventing rotation and/or binding when the electrode is pressed into engagement with the "work."

I wish to direct particular attention to the fact that the device proper is made of electric conductive material and serves as the current conductor, and that there are no cables or other cumbersome, flexible, conductors to rapidly wear and cause trouble.

The exterior of the body member 8 is suitably turned to form longitudinally spaced shoulders 36 and 37 respectively, and a thin metal jacket 38 surrounds said turned portion with the ends welded to said shoulders to form a cooling chamber 39. An elongated boss 40 is welded to said jacket as shown, and threaded inlet and outlet openings 41 and 42 respectively are provided therein and communicate with said chamber, wires 43 being provided therein in circumferentially spaced relation, and it will be noted that these wires are so positioned as to cause the cooling agent to follow a tortuous passage through said cooling chamber.

In practise the device is hydraulically actuated, the oil line 15 being connected to a pump or other pressure supply (not shown) and the intake pipe 41 is connected to a suitable source of water supply or other cooling agent, which circulates through the cooling chamber and out through the return pipe 42.

When the "work" is accurately positioned beneath the electrode 35, the pressure means (not shown) is actuated to force a supply of liquid under pressure to the cylinder 9 and the pressure of the fluid causes the piston members 16 and 17 to move downwardly, the end 20 of said piston engaging the tapered section of the collet and electrode holder and forcing the collet and electrode holder downwardly so that the electrode engages the "work." This downward travel compresses the spring until the resistance causes the frusto-conical portion of the piston to expand the collet 19, thus providing a metal to metal contact under pressure. When the liquid pressure is released the expanding pressure on the collet is also released and the spring 27 forces the mechanism back to original position and raises the electrode from the "work."

From the foregoing description, it will be obvious that I have perfected a very simple, practical and substantial welding electrode assembly which requires no flexible current carrying cables, which can be efficiently cooled, and which can be readily assembled and/or disassembled for cleaning or repair.

What I claim is:

1. In a welding machine, an electrode welding unit comprising a hollow body formed of electrically conductive material, an expansible piston assembly reciprocatingly mounted in said hollow body and including a piston rod projecting beyond the body and having an electrode holder mounted thereon, an electrode in the holder, a spring within said body and interposed between one end thereof and said piston assembly, and an opening in the upper end of the body whereby fluid pressure may be admitted against said piston assembly to force said electrode into engagement with the "work" and expand said assembly to provide a tight metal to metal contact.

2. In a welding machine, an electrode welding unit formed of electrically conductive material and comprising a hollow body member having a bushing on the one end thereof, an expansible piston assembly mounted in said body and a piston rod connected thereto, an electrode holder carried by said piston rod, an electrode mounted thereon, a spring interposed between the bushing and the piston assembly, and a pipe connected to the upper end of the body above the piston assembly for admitting fluid under pressure to said body to progressively force the electrode against the work and expand said piston assembly as the pressure increases to provide a tight metal to metal contact under pressure.

3. In a welding machine, an electrode welding unit formed of electrically conductive material and comprising a hollow body member having a bushing on one end thereof, a piston assembly mounted in said body and including an inherently resilient expansible collet, a piston rod connected thereto and having an electrode holder on the one end thereof, an electrode mounted thereon, a spring interposed between said bushing and collet, and a passage open to said body member at a point above the piston assembly for admitting a pressure agent to said body.

4. In a welding machine, an electrode welding unit formed of electrically conductive material and comprising a hollow body having a bushing on the one end thereof, a piston assembly reciprocatingly mounted in said body and including an expansible collet, one end of said piston having a frusto-conical shaped end adapted to engage said collet, a piston rod secured to the collet, an electrode holder mounted on said rod, an electrode in the holder, means for preventing rotation of said holder with relation to the body member, a spring surrounding said rod and interposed between the bushing and the collet and a passage in the upper end of the body above said piston assembly for admitting a pressure agent to force the electrode into engagement with the work and expand said collet.

5. In a welding machine, an electrode welding unit formed of electrically conductive material and comprising a hollow body member having a bushing secured to one end thereof, a piston assembly reciprocatingly mounted in said body and including an expansible collet, an electrode associated with said piston assembly and movable therewith, means for admitting a pressure agent to the cylinder at a point above the piston, means for preventing rotation of the electrode with relation to the body, and a spring interposed between said piston assembly and the bushing for forcing the mechanism back to original position.

6. In a welding machine, an electrode welding unit formed of electrically conductive material and comprising a cylinder having a bushing secured to one end and forming an extension thereof, a piston assembly mounted in said cylinder and including an expansible collet, an electrode holder carried by said assembly, an electrode mounted therein, a guide mounted off-center on said holder and slidably engageable with said cylinder, a passage in the cylinder above said piston for connecting a pressure agent thereto, and a spring interposed between the bushing and the collet for forcing the mechanism back to original position.

7. In a welding machine, an electrode welding unit comprising a hollow body formed of electrically conductive material, a piston assembly reciprocatingly mounted in said hollow body and including a spring retracted piston rod projecting beyond the body, an electrode carried by said rod, a pipe line opening into said body for intermittently admitting fluid pressure against the piston assembly to force the electrode into engagement with the work, and a shell surrounding said body and provided with intake and outlet ports for admitting a cooling agent thereto, circumferentially spaced wires interposed between said hollow body and shell, said wires being arranged to cause the cooling agent to follow a tortuous passage in said shell.

8. Apparatus for moving and conducting welding current to an electrode of a welding machine comprising a cylinder, an expansible rod slidably received within said cylinder adapted to move and conduct welding current to said electrode, fluid pressure responsive means within said cylinder for simultaneously exerting expansive and axial thrusts on said rod, and means to supply fluid under pressure to said cylinder.

9. Apparatus for moving and conducting welding current to an electrode of a welding machine comprising a cylinder, a rod slidably received within said cylinder adapted to move and conduct welding current to said electrode, said rod being diametrically slotted for a portion of its length and being provided with a tapered bore in said portion, a piston within said cylinder, means engaging said piston and said tapered bore and adapted to transmit force from the piston to the tapered bore, and means to supply fluid under pressure to said piston.

LEONARD E. NICHOLS.